United States Patent [19]

Coulthard

[11] 4,248,085
[45] Feb. 3, 1981

[54] MEASUREMENT OF RELATIVE VELOCITIES

[76] Inventor: John Coulthard, 1 Sinnington Close, Guisborough, Cleveland, England

[21] Appl. No.: 785

[22] Filed: Jan. 3, 1979

[30] Foreign Application Priority Data

Jan. 3, 1978 [GB] United Kingdom ............... 95/78

[51] Int. Cl.³ ............................................. G01P 5/00
[52] U.S. Cl. ............................. 73/861.06; 73/861.23; 364/565
[58] Field of Search ..................... 73/194 E, 194 VS; 324/160, 175, 178; 364/510, 565

[56] References Cited

U.S. PATENT DOCUMENTS

| 3,762,221 | 10/1973 | Coulthard | 73/194 E |
| 3,824,015 | 7/1974 | Petit et al. | 324/160 X |
| 3,844,170 | 10/1974 | Critten | 73/194 E |
| 4,041,293 | 8/1977 | Kihlberg | 324/175 X |

FOREIGN PATENT DOCUMENTS 2544821 4/1977 Fed. Rep. of Germany ........... 324/178

Primary Examiner—Charles A. Ruehl
Attorney, Agent, or Firm—Browdy and Neimark

[57] ABSTRACT

An apparatus and method for measuring the velocity of a relative movement between first and second bodies or between a first body and a fluid. The first body may be stationary and the second body a moving body, such as hot strip steel. Alternatively, the first body may be an aircraft or ship whose velocity is to be measured or it may be a pipe or duct along which a fluid is flowing. At least two detectors are mounted on the first body and serve to detect noise signals representing disturbances in the fluid or on the second body. Correlating means generate data for producing at least two correlation or autocorrelation curves from the signals from the detectors. The data from the correlating means is then combined to enable production of a combined cross-correlation or auto-correlation curve, from which the relative velocity can be computed.

22 Claims, 16 Drawing Figures

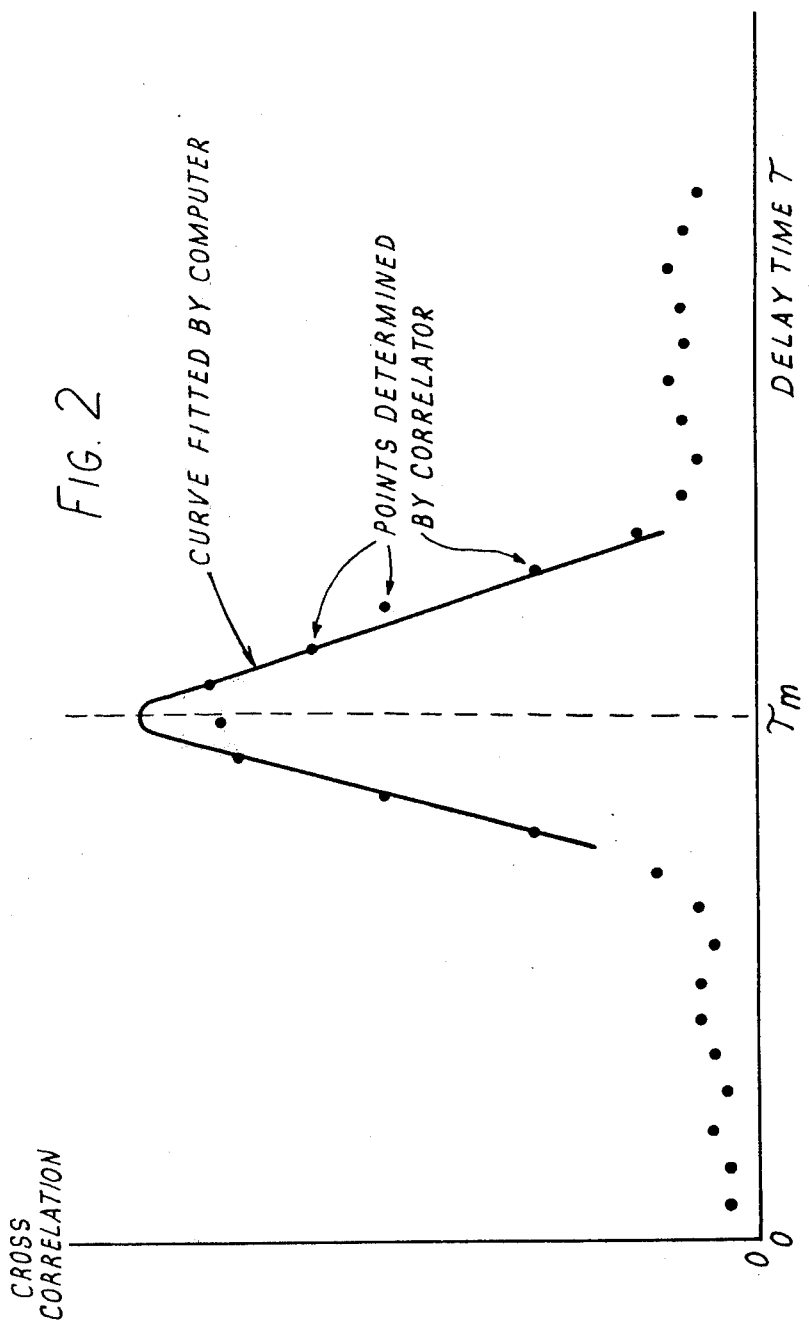

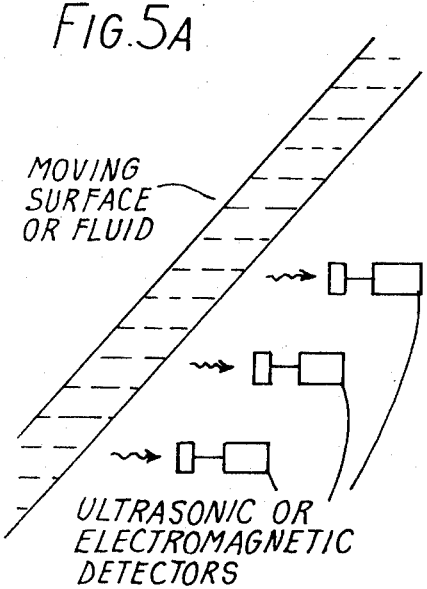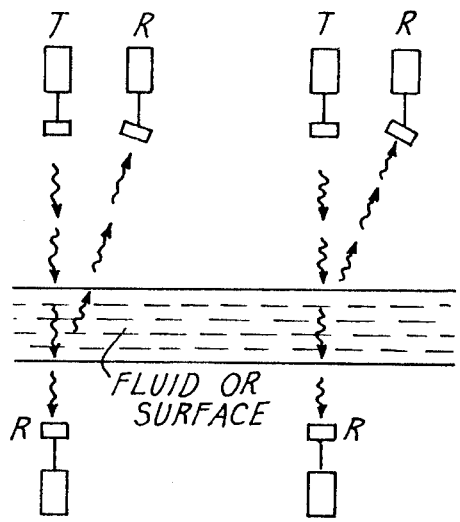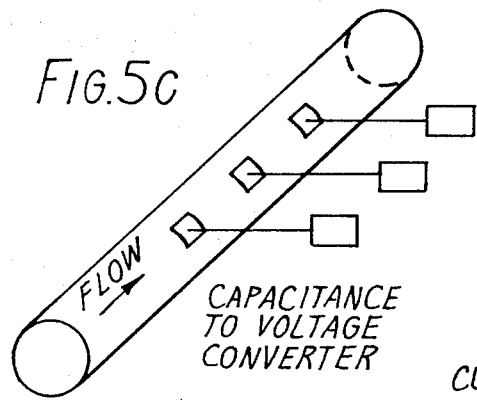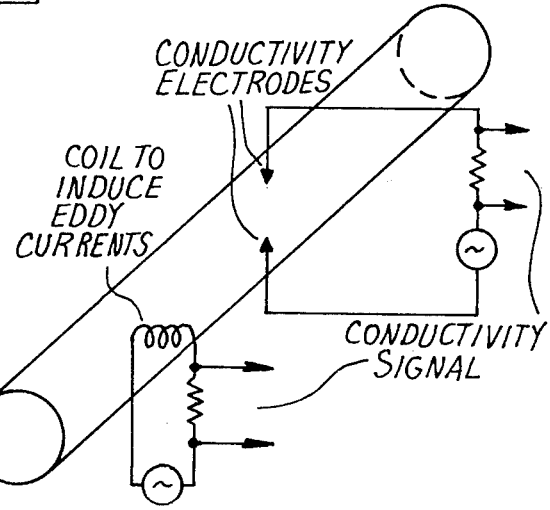

AC OR DC MAGNETIC FIELD

R.F. NUCLEONIC ABSORBTION DETECTOR

VORTEX STREET

FLOW

BLUFF BODY

CORRELATOR IN AUTOCORRELATION MODE

MEASUREMENT OF RELATIVE VELOCITIES

This invention relates to measurement of the velocity of a relative movement between first and second bodies or between a first body and a fluid.

Apparatus has been proposed for measuring the rate of flow of a fluid along a pipe by means of a cross-correlation technique. The time taken for fluid to flow between two spaced locations is determined by sensing the movement of disturbances in the fluid passing each location and cross-correlating the signals derived at each location. The peak value of the cross-correlation curve, $R_{xy}(\tau)$, which is plotted from these measurements, occurs at a time delay $\tau$ m which is a measure of the time taken for fluid to travel from one location to the other. The flow velocity V is equal to $L/\tau$ m, where L is the spacing between the locations.

An alternative method of measuring the rate of flow of a fluid along a pipe or duct is to place a bluff body in the fluid and to detect vortices generated in the fluid downstream of the body. The rate at which vortices are generated is proportional to the rate of flow of the fluid. To improve the signal: noise ratio of the output from the detector it is possible to use an auto-correlation technique.

A cross-correlation technique can be used also to measure the velocity of a ship. In this case two detectors are mounted on the ship's hull at respective locations which are spaced in a direction from fore to aft. Each detector senses disturbances such as bubbles in the water as the ship travels by. A cross-correlation technique is used to determine the time delay $\tau$ m between detection of a disturbance by the fore and aft detectors. The speed is then calculated, as above, from $\tau$ m and a knowledge of the specing between the detectors.

In each of the above measurements the time taken to produce a single plot of the correlation curve depends upon the number of points plotted and the time delay between each of the points. If there are one hundred points on the curve and succeeding points are spaced apart by 100 $\mu$secs, one hundred multiplications and additions are required to be computed in 100 $\mu$secs. This means that each multiplication and addition must be carried out in 1 $\mu$sec.

Hard-wired logic circuits are used to effect such computations and since the necessary speeds are readily achieved electronically, there is no significant delay in producing a single calculation for each point and obtaining the single plot of the correlation function. What is found in practice, however, is that a usable correlation curve is only obtained by continuing the correlation procedure for several seconds so as to produce a number of plots of the correlation curve. This means adding the results of the computations in an averaging store for a time known as the integration time. To produce a given resolution of the peak value of the correlation curve the integration time required is greater the lower the flow rate or speed of the ship. Experience with liquid flow measurements has shown that with velocities below 2 m/sec the integration time necessary to obtain a reasonably accurate estimate of the flow rate can be too long. Such delays can cause instabilities when the flow meter forms part of a closed loop system such as is found in a process plant.

The present invention includes apparatus for use in measuring the velocity of a relative movement between a first body and a second body or between a first body and a fluid, comprising at least two detectors which are each adapted to sense noise signals representing disturbances in the fluid or on the second body and which, in use, are mounted on the first body, correlating means associated with the detectors, the correlating means being adapted to generate data for producing at least two cross-correlation or auto-correlation curves from the noise signals detected by the detectors, and means for combining the data generated by the correlating means to enable production of a combined cross-correlation or auto-correlation curve from which the said velocity of relative movement can be computed.

The apparatus may comprise at least two pairs of associated detectors, the detectors in each pair being mounted, in use, at respective locations which are manually spaced in a direction parallel with the direction in which the relative movement takes place, and the correlating means may comprise cross-correlating means which are associated with respective pairs of detectors, each cross-correlating means being adapted to generate data for producing a cross-correlation curve from the noise signals detected by the associated pair of detectors.

In use, the two detectors in each pair of detectors may then be mutually spaced in the said direction by a distance equal or substantially equal to the spacing between the detectors in each other pair. Suitably, each detector is spaced in the said direction from each of the other detectors. There may be n detectors which are mutually spaced in the said direction and form n-1 pairs of associated detectors.

Alternatively, in use, a first detector of each pair is disposed at a first location along the said direction and a second detector of each pair is disposed at a second location spaced from the first location in the said direction, each detector being arranged to sense different disturbances from those sensed by each other detector at the same location.

The correlating means may comprise auto-correlating means adapted to generate data for producing an auto-correlation curve from the noise signals detected by each detector.

Each detector may be an infra-red detector, a piezoelectric detector, a hot wire anemometer, a capacitative detector or an optical detector which is sensitive to noise signals generated in a fluid by respective thermal changes, pressure changes, turbulence, electrostatic properties, or inhomogeneities in the fluid.

Means may be provided for applying a magnetic field to an electrically conducting fluid and each detector may be an electrode for detecting a voltage developed in the fluid, the fluctuating component providing the signal to be correlated.

Alternatively, means may be provided for applying a magnetic field to a magnetic fluid and each detector is a Hall effect probe or inductive sensor for detecting a voltage developed in the fluid.

Each detector may be a tuned oscillator whose tuning is affected by the proximity of a metal.

A transmitter of ultrasonic, electromagnetic or nucleonic radiation may be associated with each detector, and each detector is then adapted to detect a signal from the associated transmitter which has been transmitted through the fluid or reflected from the second body or the fluid and the noise signal sensed by each detector means is a noise signal which modulates the signal from the associated transmitter.

Each transmitter may be a transmitter of visible, invisible, laser, pulsed laser or radar electromagnetic radiation.

Means may be provided for applying a disturbance to the fluid or second body and each detector is adapted to sense the said disturbance.

The first body may be a pipe or duct along which the fluid flows, in which case the detector means are mounted on the pipe or duct at locations spaced lengthwise thereof. Alternatively, the first body may be stationary and the fluid may be smoke rising from or within a chimney, the detector means being optical means adapted to detect inhomogeneities in the smoke or being means sensitive to infra-red radiation to detect heated surfaces or hot fluids. Alternatively, the first body may be an aircraft or a ship, in which case the detector means are, in use, mounted on the aircraft or ship at locations which are spaced apart in the fore and aft direction. Alternatively, the first body may be stationary and the second body may be a moving body, such as hot strip steel, which has inhomogeneities on the surface thereof or emits infra-red or ultrasonic radiation.

This invention also includes a method of measuring the velocity of a relative movement between first and second bodies or between a first body and a fluid, comprising sensing noise signals representing disturbances in the fluid or on the second body and which are adjacent to at least two locations on the first body, generating data for producing a cross-correlation or auto-correlation curve from the noise signals detected by each sensing means, and combining the data generated by the correlating means to enable production of a combined cross-correlation or auto-correlation curve from which the said velocity of relative movement can be computed.

Suitably, the method comprises sensing noise signals adjacent to locations on the first body which are mutually spaced in a direction parallel with the direction in which relative movement takes place, generating data for producing a cross-correlation curve from the noise signals detected at at least two pairs of associated locations, and combining the data generated by the generating means to enable production of a combined cross-correlation curve from the peak of which the said velocity can be computed.

The invention will now be described, by way of example, with reference to the accompanying drawings, in which:

FIG. 2 shows the use of a curve fitting technique to determine the true peak of a cross-correlation curve in the apparatus of FIG. 1;

Figure 1:
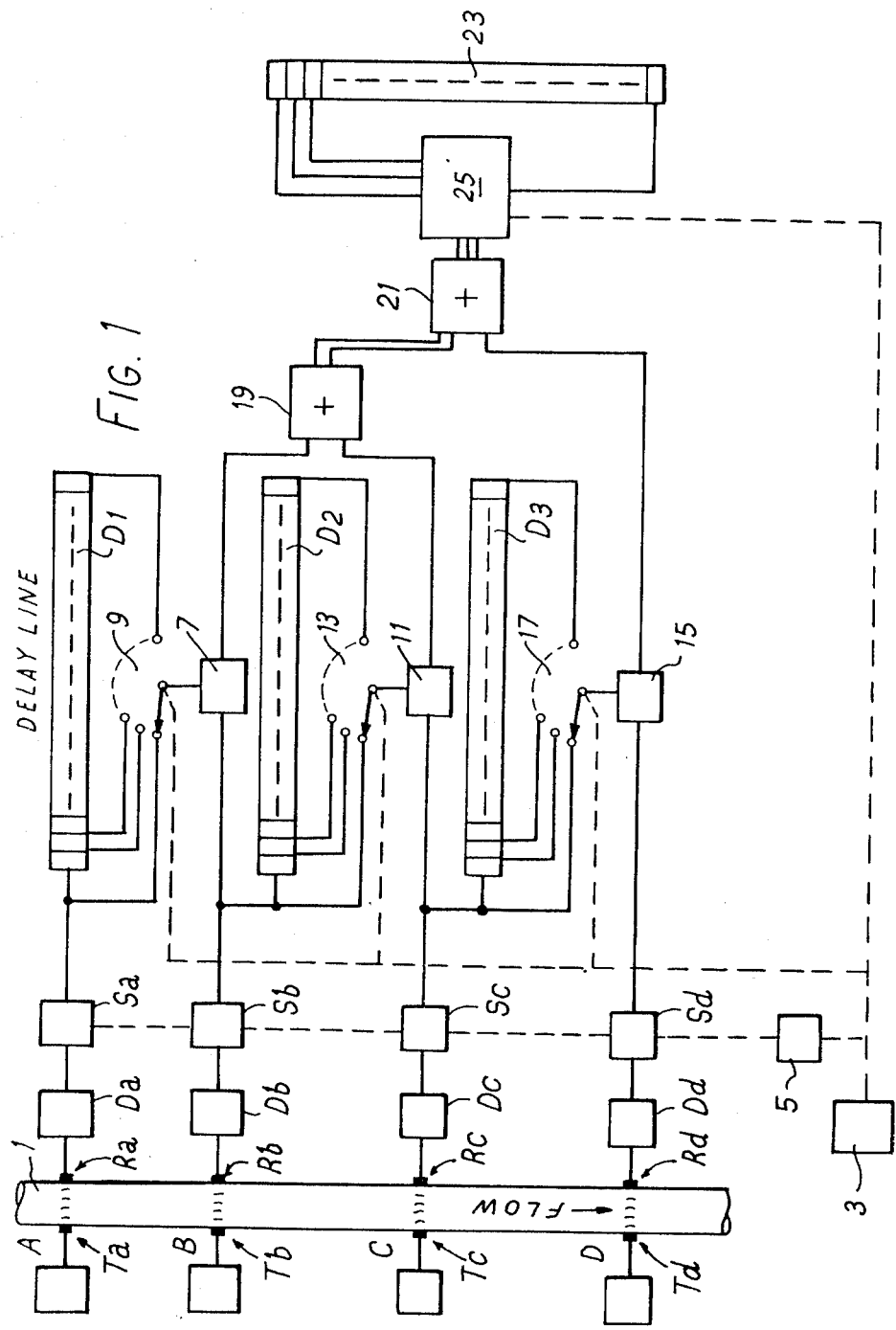
FIG. 1 shows a pipe section, transmitter and receiver stations and associated circuits of a first apparatus according to the invention.

The apparatus shown in FIG. 1 is a flowmeter wherein a cross-correlation technique is used to measure the rate of flow of a liquid along a pipe. The measurement relies upon detecting the movement of disturbances in the liquid past four locations which are mutually spaced along the pipe. The disturbances give rise to noise signals which are detected at each location, processed, and then cross-correlated with the noise signals received at the or each adjacent location. This produces three sets of data, each suitable for producing a cross-correlation curve. In fact, the three sets of data are added together to produce a combined cross-correlation curve. The peak of this curve occurs at a time delay $\tau$ m which is equal to the time taken for a disturbance to move between two adjacent locations. The flow rate is then computed by dividing the distance between adjacent locations by $\tau$ m.

Referring to FIG. 1, the present apparatus includes a section 1 of pipe for connection into an existing pipeline and four transmitting and receiving stations, an upstream station A, intermediate stations B and C, and a downstream station D, which are mutually spaced within the section. The spacings between stations A and B, B and C, and C and D are equal.

At each of the four stations within the section there is first an ultrasonic transmitter Ta,Tb,Tc and Td which includes a transducer and a driver circuit for the transducer. Each transducer is arranged to transmit ultrasonic radiation into liquid flowing past the station. Associated with each transmitter Ta,Tb,Tc or Td is a receiver transducer Ra,Rb,Rc or Rd, suitably arranged to receive ultrasonic radiation transmitted through the liquid so as to travel across a chord or diameter of the pipe section 1 or reflected back from the liquid.

A demodulator Da,Db,Dc or Dd for detecting noise signals superposed on ultrasonic radiation transmitted across the pipe section 1 is connected to an output of each receiver transducer Ra,Rb,Rc or Rd. Coupled to the demodulators, which may detect amplitude, phase, frequency or other modulation, are respective one-bit polarity samplers Sa,Sb,Sc and Sd, each of which includes a zero-crossing detector and is adapted to generate a digital output signal which is a logic 1 or 0 according to the polarity of each sample. Sampling is effected by pulses derived from a clock pulse generator 3. Pulses from the generator 3 are applied to the samplers Sa to Sd via a divider 5 which gives output pulses at the clock frequency divided by the number of computed correlation points. For example, the sampling rate satisfying Nyquist's Sampling Theorem of 2.5 KHz would require a clock frequency of 320 KHz if 128 correlation points were computed. The number of correlation points can be varied and the clock frequency varied accordingly.

Connected to the samplers Sa to Sd are three delay lines D1, D2 and D3, each formed by one bit of an eight-bit 128 word random access memory.

Thus, an output of the sampler Sa at the upstream station A is connected to a first stage in a 128 stage delay line D1. A first multiplier 7 associated with this delay line D1 has a first input connected directly to an output of the sampler Sb at the station B. A second input to the multiplier 7 is connected to a switch 9 adapted, in use, to connect the multiplier 7 sequentially to the sampler Sa at the station A and then to each of the 128 locations in the delay line D1. The switch 9 is connected to the clock pulse generator 3 and produces a sequence of seven-bit address signals for addressing each of the 128 stages in the delay line D2. When a location is read the data stored at the location is applied to the second input to the multiplier 7.

The output of the sampler Sb is also connected to a first stage of the second 128 stage delay line D2. A second multiplier 11 has a first input connected to an output of the sampler Sc at the station C and a second input which, in use, is connected sequentially via a switch 13 to the sampler B and to respective stages in the second delay line D2.

Finally, the third delay line D3 is connected to the output from the sampler Sc and is connected via a switch 17 to a third multiplier 15, which has a first input connected to the sampler D at the station D.

Pulses for operating the switches 9,13 and 17 to connect each multiplier 7,11 and 15 to respective stages in the associated delay line D1,D2 and D3 are obtained directly from the above mentioned clock pulse generator 3. The connection to the second input of each multiplier 7,11 and 15 is switched therefore at a frequency of 320 KHz, which is 128 times the frequency at which sampling is effected for a 128 point correlation curve.

Outputs from the first and second multipliers 7 and 11, respectively, are applied to a first adder circuit 19, which is a digital adder, and the output of this first adder circuit 19 and an output from the third multiplier 15 are connected to a second adder circuit 21. Further adder circuits would be necessary if more channels were used.

A sixteen-bit 128 word correlator store 23 is provided at the outputs from the second adder circuit 21. A switching circuit 25 is provided for sequentially connecting the outputs of the adder circuit 21 to respective stages in the store 23. The switching circuit 25 is a sixteen-bit adding circuit made up of a series of sixteen logic circuits, each associated with a respective one of the sixteen inputs to each memory location in the store 23. Each logic circuit includes a flip flop having a D input connected to the associated stored input and an output connected to an input to an adder circuit. A second input to each adder circuit is connected to the outputs of the adder circuits 21, a third input is connected to the adder circuit associated with the immediately preceding bit, and an output of each adder circuit is connected to one input of an AND-gate. A second input to each gate is connected to a clock input and an output of the gate is connected to the associated input to the store.

Further circuits (not shown) are provided for applying address clock pulses to the store 23 so that the contents are scanned in sequence.

Finally, a microcomputer (also not shown) is provided for analysing data in the store 23, and fitting a curve to this data, and calculating the peak location, and hence the velocity, from a knowledge of the transducer spacing.

In use of the present flowmeter, disturbances in liquid flowing along the pipeline cause noise signals to be superposed on the ultrasonic radiation received by each of the four receiver transducers Ra to Rd, as mentioned above. The demodulator Da,Db,Dc or Dd associated with each transducer extracts the noise signals from the signals at ultrasonic frequency and applies them to the associated sampler Sa,Sb,Sc or Sd. At the output of each sampler there is then produced a signal which is a logic 1 or 0, according to the instantaneous polarity of the noise signal received. Sampling is effected at a frequency of 2.5 KHz or any frequency appropriate to the signal spectrum satisfying the Nyquist Sampling Theorem. The signals produced by each of the samplers Sa to Sc are applied to respective delay lines D1,D2 and D3, where they are clocked from one stage to the next at the sampling frequency although, in practice, a random access memory can be used and delays effected by switching the address lines.

As also described above, the first multiplier 7 has an input connected directly to the output of the sampler Sb and a second input connected sequentially to the output of the sampler Sa and to the various stages in the first delay line D1. The connections to the second input of the multiplier 7 are switched at a frequency which is equal to 128 times the sampling frequency. Accordingly, the output signal from the sampler Sb remains at the same logic condition for sufficient time for this output to be multiplied sequentially by the output signal from the sampler Sa and then by each of the bits in the various stages of the first delay line D1. This means that a sequence of 128 signals is produced at the output of the first multiplier 7, the first signal in the sequence representing the product of the output signals from the samplers Sa and Sb and each of the remaining signals in the sequence representing the product of the output signal from the sampler Sb and a signal previously applied from the sampler Sa to the first delay line D1 for progressively increasing lengths of time. The sequence of signals from the first multiplier 7 is therefore data from which a correlation curve can be produced.

Data suitable for producing a correlation curve is likewise obtained at the outputs of the second and third multipliers 11 and 15, respectively, and other if more are used.

In the first adder circuit 19 each signal from the first multiplier 7 is added to the signal generated at the same time by the second multiplier 11. The sum of two signals applied to the first adder circuit 19 is then applied to the second adder circuit 21, where it is added to the corresponding signal from the third multiplier 15. In the result, there is produced at the outputs of the second adder circuit 21 a sequence of 128 signals, each representing the sum of signals generated at the same time by the first, second and third multipliers 7,11 and 15, respectively. Each of the three signals in a sum is itself the product of two signals one of which is delayed relative to the other by a time characteristic of that sum.

The outputs of the second adder circuit 21 are applied sequentially via the switching circuit 25 to respective 128 memory locations in the correlation store 23. When the sixteen bits at a location in the store 23 are connected to the circuit 25 the existing contents of a location are first applied via the flip-flop to the adder circuit in the associated logic circuit, then the output signal at the second input to the adder circuit and a carry-over signal from the preceding adder circuit in circuit 25 are added to the existing contents, and the outputs from all of the adder circuits in the circuit 25 are written into the location. There is therefore built up in the correlation store 23 data from each of the multipliers. This data is suitable for plotting a combined cross-correlation curve. In fact, in preparing such a curve, the magnitude of the contents in each of the 128 locations is plotted as the ordinate to provide one point on the curve and the abscissa of the point is the delay time between each pair of signals whose product has been applied to that location.

As mentioned above, a microcomputer is provided for analysing the contents of the store 23. The need for this arises from the fact that the cross-correlation curve is computed at discrete values of delay time. Frequently, however, the transit time peak does not correspond exactly to one of the delay times used in computing the correlation curve. To determine the true peak some interpolation exercise can be employed, but the most accurate method is to "fit" a mathematical curve to the computed points using the microcomputer. The result of such a curve-fitting is shown in FIG. 2. The curve fitting technique also increases the speed of response of the system because a "valid" curve (i.e. a curve with a distinct peak) can be detected and analysed as soon as it emerges. This method may also be employed to analyse asymmetric or noisy correlation curves or curves derived from a wake due to a vortex shedding body which produces multiple peaked correlation curves. The curve data can be transferred to other locations for further analyses such as exponential averaging and Fourier Transformation where the phase-frequency properties of the cross-power spectrum can be used to determine the velocity of all signal frequency components or digital filtering can be employed to remove unwanted spectral components or apply correction factors. Alternatively, the correlation stored can be cleared to allow a new curve to be built up.

Once the peak of the correlation curve is known the time delay $\tau m$ at which the peak occurs enables the flow velocity to be found from the equation $U = L/\tau m$, where L equals the spacing between each pair of adjacent stations and $\tau m$ is time delay corresponding to the peak value of the cross-correlation curve found from the curve fitting routine analysis.

Figure 3A:
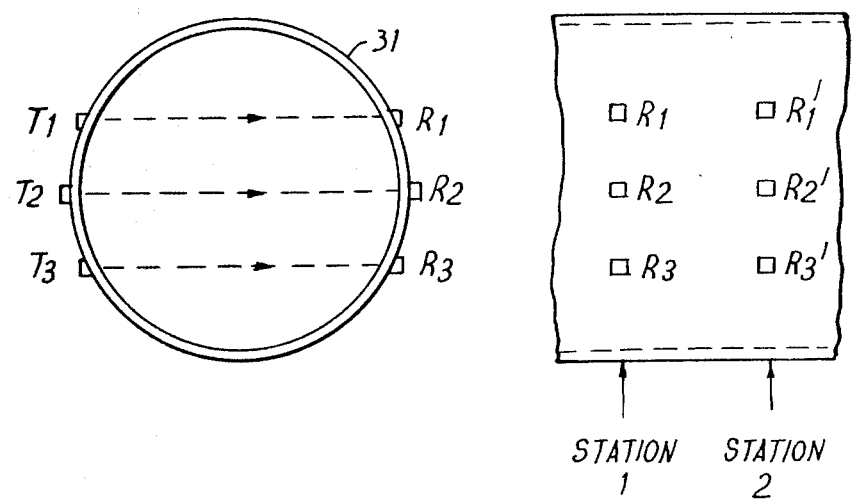
FIGS. 3A and 3B show alternative arrangements of transmitters and receivers in apparatus according to the invention.

In a second embodiment of the invention, shown in FIG. 3A, a series of ultrasonic transmitters T1,T2 and T3 are provided at angularly spaced locations about the axis of a section of a pipe 31 at a first station. Associated with each of the transmitters T1 to T3 is a receiver transducer R1,R2 or R3 which is also disposed at the first station and is arranged to receive radiation transmitted by the transmitter across a chord of the pipe section. At a second station, downstream from the first, there is a corresponding series of associated transmitters T'1 to T'3 and receiver transducers R'1 to R'3. Each of the transmitters T'1 to T'3 at the second station is disposed at the same angular location as an associated transmitter T1,T2 or T3 at the first station, as are the associated receiver tranducers. Noise signals received by each receiver transducer R'1, R'2, or R'3 at the second station represent therefore the same disturbances as are represented by noise signals represented by noise signals received by the associated receiver transducer R1,R2 or R3 at the first station. The noise signals received by each pair of associated receiver transducers R1 and R'1, R2 and R'2 and R3 and R'3 are cross-correlated to provide a set of data from which a cross-correlation curve is produced. FIG. 3C shows an arrangement of three transmitters T1 to T3 and three receivers R1 to R3 for measuring the flow rate at different depths in an open duct. Associated transmitters and receivers, disposed at a second location, are not shown.

Figure 3B:
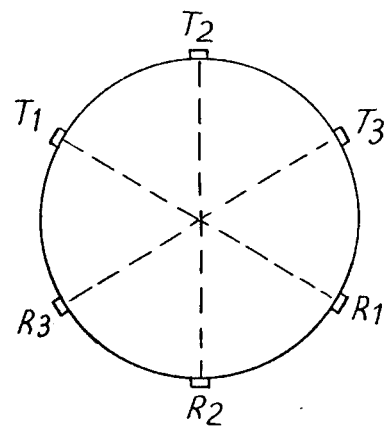
Figure 3C:
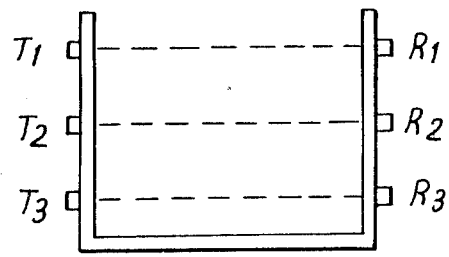
FIG. 3C shows an arrangement of transmitters and receivers for an open duct.

FIG. 3B shows a further embodiment in which each receiver transducer is disposed at a diametrically opposed location to that of the associated transmitter.

It will be appreciated that faster computations of the correlation curve can be made by using more than four transmitting and receiving stations. If there are n stations and each pair of adjacent stations are equally spaced, there are n−1 sets of data for producing the curve and a resolution equal to that obtained from only a single pair can be obtained in a time reduced by a factor of 1/n−1.

The spacing between adjacent pairs of stations need not be the same as long as allowance for differences in spacing, and hence in delay time, is made before feeding data into the correlation store.

It is not essential to use each intermediate station as one of a pair with eqch of its adjacent stations.

FIG. 5B shows the ultrasonic transmitters and receivers used in the apparatus of FIG. 1 and also indicates that nucleonic or electromagnetic transmitters and receivers can be used. The electromagnetic radiation can be pulsed or continuous wave laser, visible, invisible, doppler laser or doppler radar electro-magnetic radiation can be employed. Alternatively, as shown in FIG. 5D, each transmitter may apply a voltage to the fluid and each receiver may be adapted to generate a signal representing the electrical conductivity of the fluid. If a divergent beam of radiation is used, several receivers may be used with a single transmitter. The ultrasonic transmitters can consist of phased transducer arrays (FIG. 5G) to alter the point of focus or they can be driven by phase modulated or pseudo random binary sequence coded to destroy acoustic standing waves.

Figure 5E:
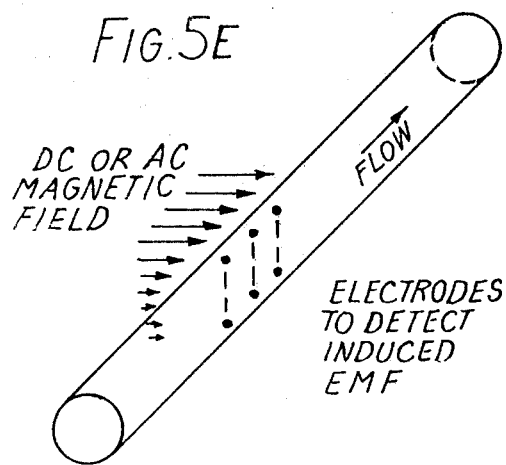
FIGS. 5A and 5J show various transmitters and receivers used in apparatus according to the invention.
Figure 5F:
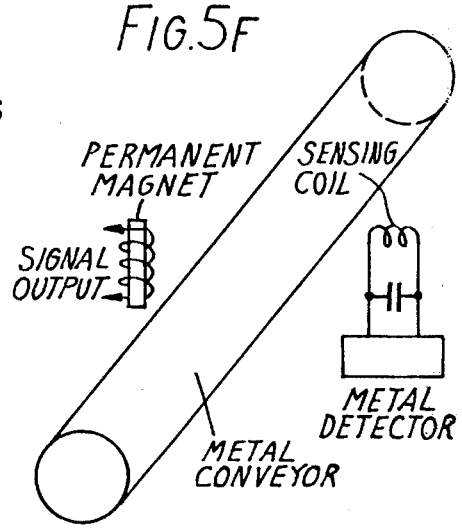
Figure 5G:
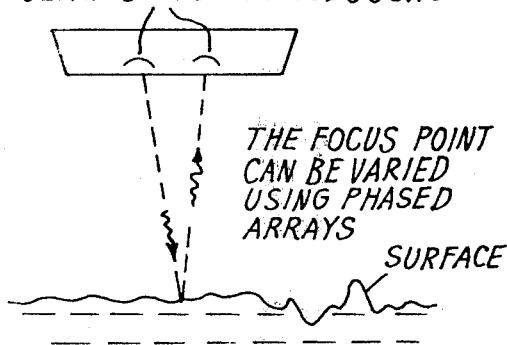
Figure 5H:
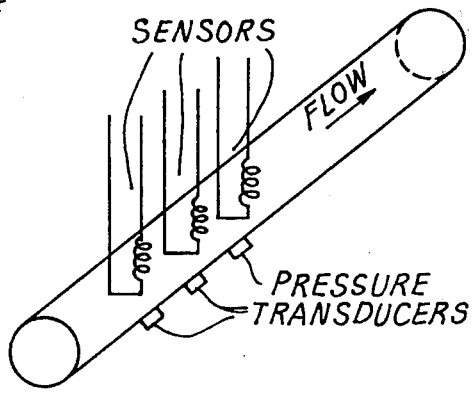
Figure 5I:
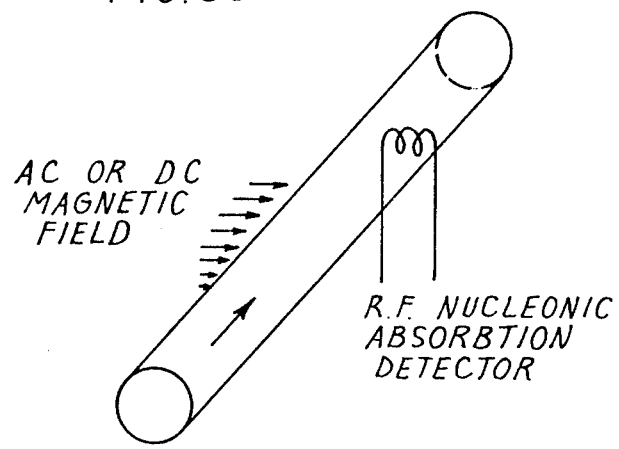

Changes of the electrostatic properties of the fluid may be detected as in FIG. 5C, or signals may be generated due to the properties of nuclear magnetic resonance, FIG. 5I. If the fluid contains magnetic particles such as an iron ore slurry or an ore on a conveyor, suitable means may be employed to provide signals related to the presence of ferrous or non-ferrous metals. FIG. 5E shows apparatus wherein a conducting fluid moving through one or several magnetic fields induces voltages on electrodes suitably situated.

If the material passing through the sensing field is itself magnetic such as an iron ore than variations in the magnetic properties can be detected by Hall effect probes, inductive or other sensors to provide suitable signals. Similarly, as shown in FIG. 5F, the principle of metal detection can be employed so that ferrous or non-ferrous materials conveyed along a tube or duct can be detected to provide suitable signals.

Alternatively, disturbances, in the form of foreign particles, radioactive particles, thermal disturbances, conductive fluids, marks detectable by optical means etc., either random or pseudo random, can be inserted into or imposed upon the fluid or surface. These disturbances can be detected by any means described herein. Cross correlation can be between the means of imposing the disturbances and the detectors to provide a measure of the disturbance transit time between the point of insertion and the detector means.

Another alternative is to dispense with the transmitters and to use receivers sensitive to pressure, thermal, optical or density changes in the adjacent fluid or sensitive to flow generated electromagnetic, acoustic or ultrasonic noise as shown in FIGS. 5A and H. In measuring the rate at which smoke rises from or within a chimney electro-optical devices may be used in conjunction with telescopes to detect upwards movement of inhomogeneities.

Finally, as mentioned above, other embodiments of the invention are used for measuring the velocity of an aircraft or ship using gated pulse echo techniques employing radar or ultrasonics, transmitter and receiving means, or receiver means alone, being provided at a series of locations spaced in a fore-and-aft direction on the hull or wings and the signals from adjacent pairs being cross-correlated and then added together.

Figure 5J:
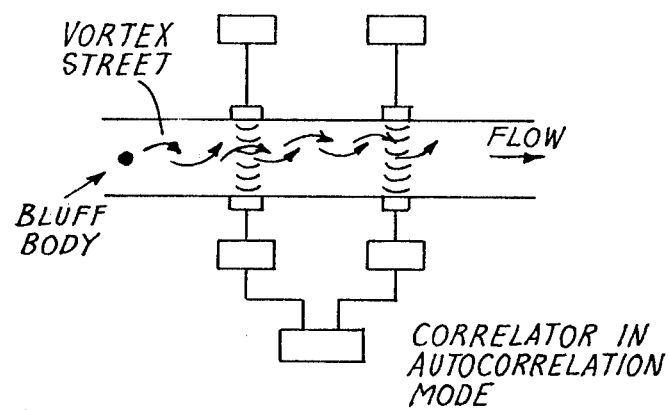

In a further embodiment of the invention, which is a vortex flowmeter and is shown in FIG. 5J, the vortices generated downstream of a bluff body are detected at two or more different locations which are spaced lengthwise of a pipe along which a liquid is flowing or which are angularly spaced about the axis of the pipe. Associated with each detector is an auto-correlator. The outputs from the auto-correlators are combined by means of adding circuits, applied to a store, and used to form a combined auto-correlation curve in a similar manner to that in which a combined cross-correlation curve is formed in FIG. 1.

In a further embodiment, each cross-correlation curve or a combined cross-correlation curve is stored in a separate memory location and the curves are then combined later for example by using computer software. In this manner, one can use different kinds of detector (e.g. one detector focussed onto water and the other onto the bank) and detect the velocity of a ship relative to the water and to the bank.

The whole of the multi-channel correlation circuit of FIG. 1 may be fabricated into a single integrated circuit. In some applications, particularly for signals of limited bandwidth, multiplication, addition and storage is carried out by a microcomputer. The multiplier circuits of FIG. 1 may be replaced by exclusive NOR-gates since perfect correlation can be assumed when the two signals to be multiplied are both 0 or 1. If signals of low frequencies are to be cross-correlated, such multiplications, additions and storage can be carried out by the microprocessor itself or by another microprocessor programmed for the purpose.

In another embodiment a single correlator circuit is used in conjunction with two or more receiver transducers, the transducers being sequentially connected to the input of the correlator in a time division multiplex technique.

The delay lines D1 to D3 of FIG. 1 can be replaced by shift registers.

Figure 4:
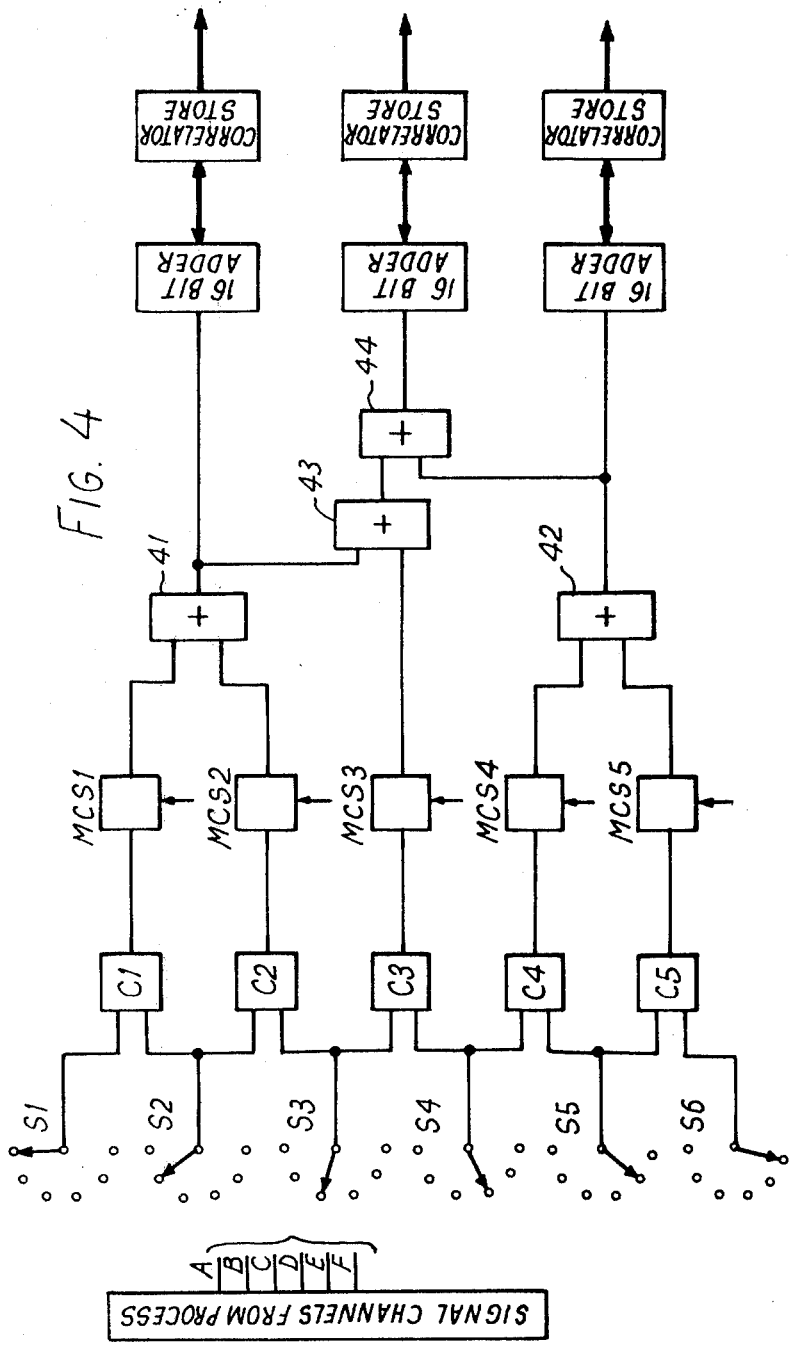
FIG. 4 shows diagrammatically a further apparatus according to the invention.

FIG. 4 of the drawings is a multi-channel device which, like the device shown in FIG. 1, is used for measuring the rate of flow of a liquid along a pipe.

Referring to FIG. 4, a series of six input channels A,B,C,D,E and F are connected to respective receiver transducers (not shown) at spaced locations on a pipe (not shown) along which a liquid is flowing. Each of the channels A to F is connected to an associated fixed pole of each of six switches S1 to S6.

A movable pole of each of the switches S1 to S6 is connected to an adjacent pair of cross-correlators in a series of five cross-correlators C1 to C5, each of these cross-correlations being formed of a delay line and multiplier, corresponding to the delay lines D1 to D3 and the multipliers 7,11 and 15 of FIG. 1. At the output of each of the cross-correlators C1 to C5 is an associated mode control switch MCS1,2,3,4 or 5.

The mode control switches MCS1 to 5 couple the cross-correlators C1 to C5 to binary adder circuits 41,42,43 and 44 and the outputs of the adder circuits 41,44 and 42 are connected to respective sixteen bit adder circuits. Connected to each sixteen-bit adder circuit is a correlation store, corresponding to the store 23 of FIG. 1, and connected to the outputs from the correlation stores is a microcomputer, not shown.

The device of FIG. 4 operates in the same manner as that shown in FIG. 1 in that input signals from the receiver transducers are detected, sampled and applied to cross-correlators C1 to C5 and the outputs of the cross-correlators are combined in the adding circuits 41 to 45 for use in producing combined correlation curves.

In the device of FIG. 4, however, the switches S1 to S6 can be operated to allow a signal from any receiver transducer to be cross-correlated with the signal from any other transducer or to be auto-correlated with itself. This means that forward or reverse relative velocities can be measured and the range of relative velocity measurements can be extended by cross-correlating between receiver transducers of higher spacing at higher velocities. The mode control switches MCS1 to MCS5 are operated to control the manner in which individual sets of correlation data are added together by the adding circuits 41 to 44. This allows different modes to be employed, which is of particular advantage when measuring flow in deep channels or rivers or when measuring relative velocities between transducers and surfaces.

The device of FIG. 4 can also be operated to store the cross-correlation data from the various transducers in different memories, the stored data being added together, used independently or appropriately combined so that separate or related velocities can be measured. For example, measurements taken by transducers on a ship in a flowing river can be used to measure independently the velocity of the ship relative to the water and its velocity relative to the river bed.

An example of a mode in which the device of FIG. 4 can be operated in one in which the input channels A to F are connected to transducers which are mutually spaced along the pipe section. The switches S1 to S6 are placed in the condition shown in FIG. 4 and the mode control switches MCS1 to 5 are all switched on. The combined cross-correlation data is then given by $A \times B + B \times C + C \times D + D \times E + E \times F$, (where $A \times B$ means A cross-correlated with B).

In a second example, the transducers connected to channels A and D are at the same location relative to the direction of flow, as are the transducers connected to channels B and E and the transducers connected to channels C and F. The mode control switches MCS1,2,4 and 5 are switched on and the combined cross-correlation data is $A \times B + B \times C + D \times E + E \times F$.

Finally, with the transducers for channels A,C and E at one location and B,D and F at another location and the switches MCS1, 3 and 5 switched on, the cross-correlation data is $A \times B + C \times D + E \times F$.

I claim:

1. Apparatus for use in measuring the velocity of a relative movement between a first body and a second body or between a first body and a fluid, comprising at least two detectors which are each adapted to sense noise signals representing disturbances in the fluid or on the second body and which, in use, are mounted on the first body, correlating means associated with the detectors, the correlating means being adapted to generate data for producing at least two cross-correlation or auto-correlation curves from the noise signals detected by the detectors, and means for combining the data generated by the correlating means in such a matter as to enable a more rapid production of a combined cross-correlation or auto-correlation curve from which the said velocity of relative movement can be computed.

2. Apparatus as claimed in claim 1, comprising at least two pairs of associated detectors, the detectors in each pair being mounted, in use, at respective locations which are mutually spaced in a direction parallel with the direction in which the relative movement takes place, the correlating means comprising cross-correlating means which are associated with respective pairs of detectors, each cross-correlating means being adapted to generate data for producing a cross-correlation curve from the noise signals detected by the associated pair of detectors.

3. Apparatus as claimed in claim 2, wherein, in use, the two detectors in each pair of detectors are mutually spaced in the said direction by a distance equal or substantially equal to the spacing between the detectors in each other pair.

4. Apparatus as claimed in claim 3, wherein each detector is spaced in the said direction from each of the other detectors.

5. Apparatus as claimed in claim 4, comprising n detectors which are mutually spaced in the said direction and form n−1 pairs of associated detectors.

6. Apparatus as claimed in claim 2, wherein, in use, a first detector of each pair is disposed at a first location along the said direction and a second detector of each pair is disposed at a second location spaced from the first location in the said direction, each detector being arranged to sense different disturbances from those sensed by each other detector at the same location.

7. Apparatus as claimed in claim 1, wherein the correlating means comprises a single correlator, and means are provided for sequentially connecting the outputs of the detectors to the said correlator.

8. Apparatus as claimed in claim 1, comprising switching means for selectively connecting each detector to any one of a plurality of correlating means, and means for selectively combining the data generated by each correlating means with data generated by any one of a plurality of other correlating means.

9. Apparatus as claimed in claim 1, comprising means for temporarily storing data from the combining means.

10. Apparatus as claimed in claim 1, which further comprises means connected to the combining means which are adapted to fit a mathematical cross-correlation or auto-correlation curve to the data from the combining means, whereby a more accurate determination of a peak value of the combined curve which could be plotted from the generated data is obtained.

11. Apparatus as claimed in claim 10, wherein the said means which are adapted to fit a mathematical cross-correlation or auto-correlation curve comprise a microprocessor.

12. Apparatus as claimed in claim 1, wherein each detector is an infra-red detector, a piezo-electric detector, a hot wire anemometer, a capacitive detector or an optical detector which is sensitive to noise signals generated in a fluid by respective thermal changes, pressure changes, turbulence, electrostatic properties, or inhomogeneities in the fluid.

13. Apparatus as claimed in claim 1, wherein means are provided for applying a magnetic field to an electrically conducting fluid and each detector is an electrode for detecting a voltage developed in the fluid.

14. Apparatus as claimed in claim 1, wherein means are provided for applying a magnetic field to a magnetic fluid and each detector is a Hall effect probe or inductive sensor for detecting a voltage developed in the fluid.

15. Apparatus as claimed in claim 1, wherein each detector is a tuned oscillator whose tuning is affected by the proximity of a metal.

16. Apparatus as claimed in claim 1, wherein a transmitter of ultrasonic, electromagnetic or nucleonic radiation is associated with each detector, and each detector is adapted to detect a signal from the associated transmitter which has been transmitted through the fluid or reflected from the second body or the fluid and the noise signal sensed by each detector means is a noise signal which modulates the signal from the associated transmitter.

17. Apparatus as claimed in claim 16, wherein each transmitter is a transmitter of visible, invisible, laser, pulsed laser or radar electromagnetic radiation.

18. Apparatus as claimed in claim 1, wherein means are provided for applying a disturbance to the fluid or second body and each detector is adapted to sense the said disturbance.

19. Apparatus as claimed in claim 18, wherein the means for applying a disturbance is a bluff body for mounting in a liquid, each detector is, in use, mounted downstream of the bluff body, and the correlating means comprise auto-correlating means associated with respective detector.

20. Apparatus as claimed in claim 1, wherein means are provided for analysing the data from the combining means, determining the phase-frequency properties of the cross-power spectrum, and hence determining the said relative velocity.

21. A method of measuring the velocity of a relative movement between first and second bodies or between a first body and a fluid, comprising sensing noise signals representing disturbances in the fluid or on the second body and which are adjacent to at least two locations on the first body, generating data for producing a cross-correlation or auto-correlation curve from the sensed noise signals, and combining the data generated in such a manner as to enable a more rapid production of a combined cross-correlation or auto-correlation curve from which the said velocity of relative movement can be computed.

22. A method as claimed in claim 21, comprising sensing noise signals adjacent to locations on the first body which are mutually spaced in a direction parallel with the direction in which relative movement takes place, generating data for producing a cross-correlation curve from the noise signals detected at at least two pairs of associated locations, and combining the data generated by the generating means to enable production of a combined cross-correlation curve from the peak of which the said velocity can be computed.

* * * * *